US006925855B2

(12) United States Patent
De Ronne et al.

(10) Patent No.: US 6,925,855 B2
(45) Date of Patent: Aug. 9, 2005

(54) FUEL FILLING DETECTION

(75) Inventors: Michael P. De Ronne, Beverly Hills, MI (US); Marc J. Gonsiorowski, Linden, MI (US); Gregory E. Labus, Fenton, MI (US); Chad W. Lehner, Howell, MI (US)

(73) Assignee: General Motors Corporation, Detroit, MI (US)

( * ) Notice: Subject to any disclaimer, the term of this patent is extended or adjusted under 35 U.S.C. 154(b) by 31 days.

(21) Appl. No.: 10/632,306

(22) Filed: Aug. 1, 2003

(65) Prior Publication Data

US 2005/0022584 A1 Feb. 3, 2005

(51) Int. Cl.[7] .............................................. G01M 15/00

(52) U.S. Cl. ......................... 73/49.7; 73/49.2; 123/520

(58) Field of Search ................................ 73/49.2, 49.7; 123/518, 519, 520

(56) References Cited

U.S. PATENT DOCUMENTS 5,295,472 A * 3/1994 Otsuka et al. .............. 123/520
6,321,727 B1 11/2001 Reddy et al. ............... 123/520
6,363,921 B1 * 4/2002 Cook et al. ................. 123/520

* cited by examiner

*Primary Examiner*—Daniel S. Larkin
(74) *Attorney, Agent, or Firm*—Christopher DeVries

(57) ABSTRACT

A leak detection system for a vehicle includes a fuel system and a controller. The controller communicates with the fuel system to detect a fuel filling event. The controller initiates a vapor leak test of the fuel system and terminates the vapor leak test if a fuel filling event is detected.

29 Claims, 2 Drawing Sheets

FUEL FILLING DETECTION

FIELD OF THE INVENTION

The present invention relates to vapor leak diagnostic systems for vehicles, and more particularly to a fuel filling detection algorithm for a vapor leak diagnostic system.

BACKGROUND OF THE INVENTION

A vehicle having an internal combustion engine includes a fuel tank that stores liquid fuel, such as gasoline, diesel, methanol or other fuels. The liquid fuel evaporates into fuel vapors that increase pressure within the fuel tank. Evaporation is caused by energy that is transferred to the fuel tank. Sources of energy include radiation (e.g. sun energy), convection, and conduction. Increased vapor pressure in the fuel system may effect the rate that vapor fuel is released into the atmosphere through a leak in the fuel system. Vapor leak diagnostic systems attempt to diagnose vapor fuel leaks.

SUMMARY OF THE INVENTION

The present invention provides a refueling detection system for a vehicle. The refueling detection system includes a fuel system and a controller. The controller communicates with the fuel system to detect a fuel filling event. The controller initiates a vapor leak test of the fuel system and terminates the vapor leak test if a fuel filling event is detected.

In one feature, a vent solenoid seals the fuel system. The controller closes the vent solenoid after initiating the vapor leak test.

In another feature, the controller monitors vapor pressure within the fuel system to detect the fuel filling event.

In still another feature, the controller monitors a fuel level in a fuel tank of the fuel system to detect the fuel filling event.

In yet another feature, the controller monitors a fuel level within a fuel tank of the fuel system after terminating the vapor leak test to confirm that the fuel filling event occurred.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
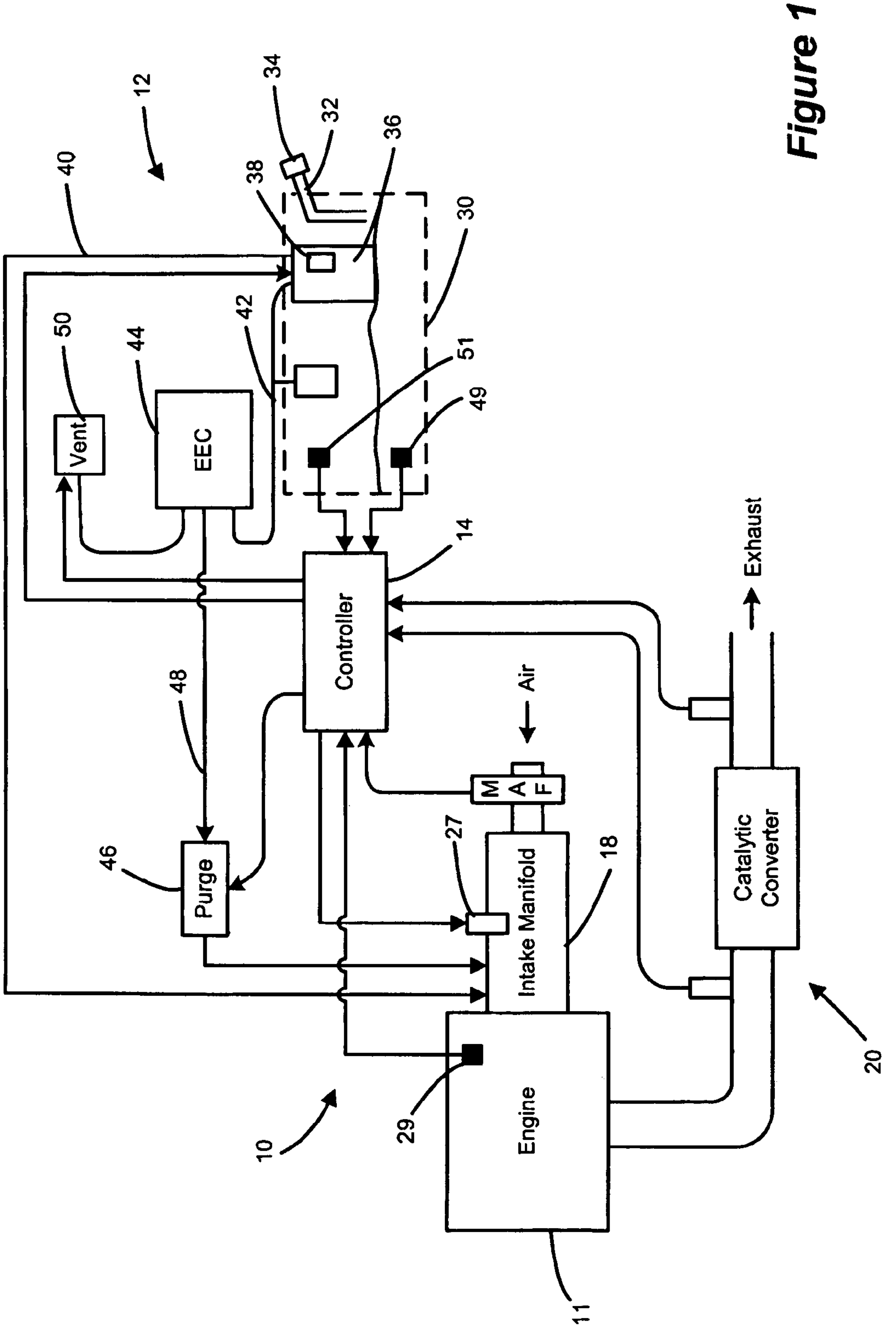
FIG. 1 is a functional block diagram of a vehicle including a fuel filling detection algorithm for a vapor leak diagnostic system according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle 10 includes an engine 11 with a fuel system 12. A controller 14 communicates with the engine 11 and the fuel system 12. While one controller 14 is shown, multiple controllers may be employed. The controller 14 executes a fuel system leak diagnostic or pressure test as will be described below. The fuel system 12 selectively supplies liquid and/or vapor fuel to the engine 11 in a conventional manner.

The engine 11 includes an intake manifold 18 and an exhaust system 20. Air and fuel are drawn into the engine 11 and are combusted in the cylinders of the engine 11. An intake manifold temperature sensor 27 generates an intake air temperature signal that is output to the controller 14. It is anticipated, however, that the temperature sensor 27 may be disposed in other locations, such as an air intake, to generate the intake air temperature signal. An engine coolant temperature sensor 29 generates a coolant temperature signal that is output to the controller 14.

The fuel system 12 includes a fuel tank 30 that contains both liquid and vapor fuel. A fuel inlet 32 extends from the fuel tank 30 to an outer portion of the vehicle 10 to enable fuel filling. A fuel cap 34 not shown closes the fuel inlet 32 and may include a bleed tube (not shown). A modular reservoir assembly (MRA) 36 is located inside the fuel tank 30 and includes a fuel pump 38, a liquid fuel line 40, and a vapor fuel line 42. The fuel pump 38 pumps liquid fuel through the liquid fuel line 40 to the engine 11.

Vapor fuel flows through the vapor fuel line 42 into an evaporative emissions canister (EEC) or carbon canister 44. A vapor fuel line 48 connects a purge solenoid valve 46 to the EEC 44. The controller 14 opens the purge solenoid valve 46 to enable vapor fuel flow to the engine 11 and closes the purge solenoid valve 46 to disable vapor fuel flow to the engine 11. The purge solenoid valve 46 may also be positioned between fully open and fully closed positions for partial vapor flow.

The controller 14 modulates a canister vent valve 50 to selectively enable air flow from atmosphere through the EEC 44. A fuel level sensor 49 and a vapor pressure sensor 51 are located within the fuel tank 30 to provide fuel level and pressure signals, respectively, which are output to the controller 14. The fuel level sensor 49 can include a float, a resistive strip or any other suitable sensor. The fuel level signal may be converted to % of fuel tank volume by applying a scaling factor to the voltage signal. The vapor pressure sensor 51 measures the pressure in units of kPa, although other units/scales may be used. The pressure signal is provided as a voltage and is converted to kPa using a scaling factor.

Figure 2:
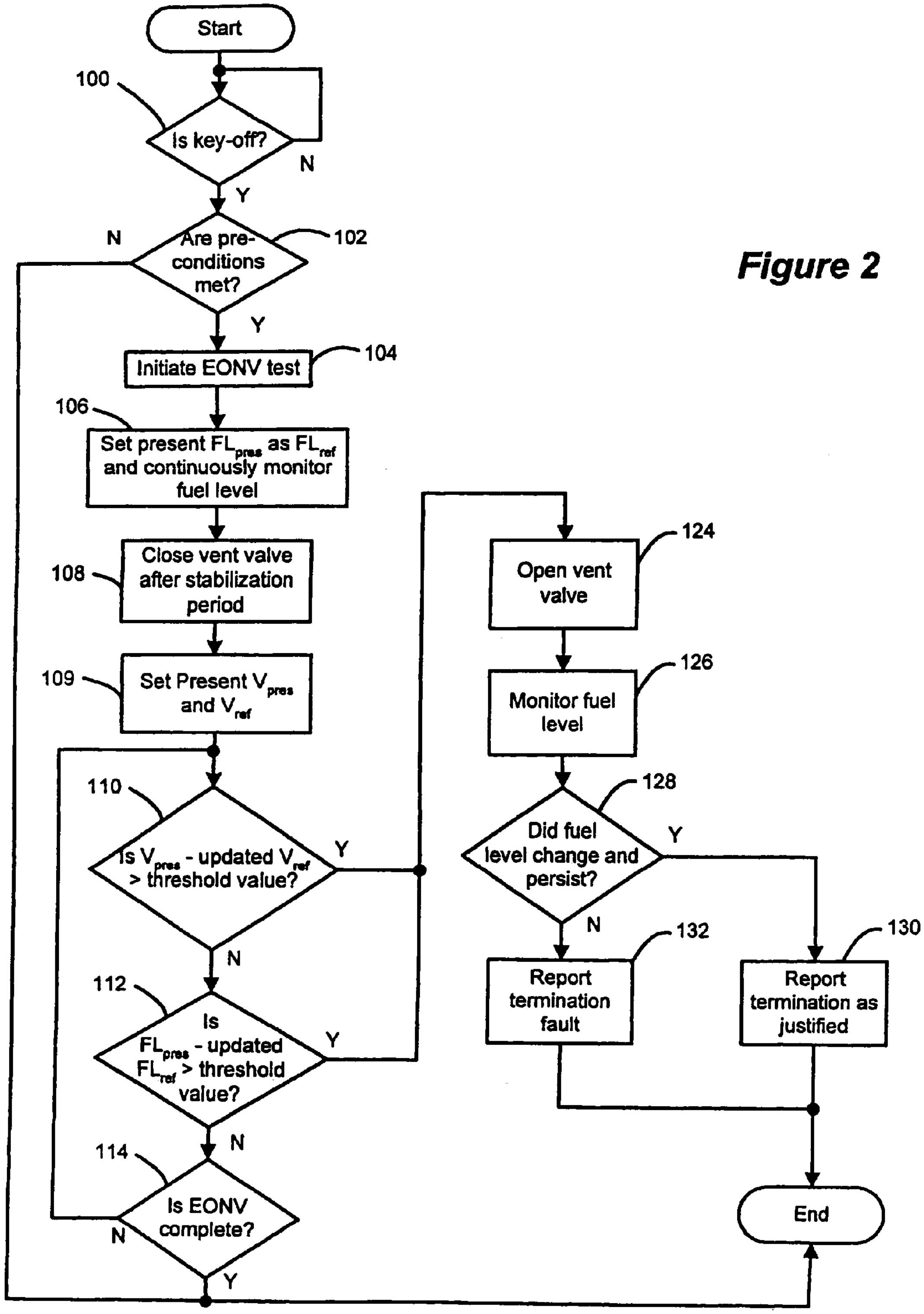
FIG. 2 is a flowchart illustrating the steps of a fuel filling detection algorithm for a vapor leak diagnostic system according to the present invention.

Referring now to FIG. 2, steps of a method for detecting a fuel filling event during an engine off natural vacuum (EONV) test are shown. The EONV test is performed to ensure proper sealing of the fuel system 12. The EONV test monitors pressure within the fuel tank to diagnose a gradual change in pressure over time (i.e., sealed). However, a fuel filling event will significantly impact the pressure and adversely impact the accuracy of the EONV test. The present invention monitors the pressure signal generated by the vapor pressure sensor 51 and the fuel level signal generated by the fuel level sensor 49 to identify a fuel filling event during the EONV test.

In step 100, control determines whether an ignition key has been switched to an off position. If false, control loops back to step 100. If true, control determines whether one or more pre-conditions are met in step 102. For example, one pre-condition may relate to engine temperature. For example, the pre-condition may relate to fuel level. For example, the pre-condition may require the fuel level to be between 15% to 85% of the rated fuel tank capacity. Other preconditions may require the vehicle 10 to run a first period, such as 10 minutes, and to be driven for a first distance, such as 3 miles. It can be appreciated that other temperature, time, and/or distance values may be used. Alternatively, other preconditions in addition to or instead of the foregoing preconditions may be used. If the pre-conditions are not met, then control ends. If the pre-conditions are met, then control continues with step 104.

In step 104, control initiates the EONV test. In step 106, a present fuel level signal ($FL_{pres}$) from the fuel level sensor 49 is set equal to a reference fuel level ($FL_{ref}$). In step 108, control closes the vent valve 50 to seal the fuel system 12 after a stabilization period. In step 110, control compares the difference between a present vapor pressure signal ($V_{pres}$) and a reference vapor pressure signal ($V_{ref}$) to a predetermined vacuum value. If the difference is less than the predetermined or threshold value, control continues with step 112. Otherwise, a fuel filling event is detected and the controller 14 continues with step 124. $V_{ref}$ is continuously updated based on $V_{pres}$. For example, $V_{ref}$ can be updated every second although the rate of update may vary. Although $V_{ref}$ is continuously updated based on $V_{pres}$, a sufficient amount of time typically elapses after the update event and prior to execution of step 110 for $V_{pres}$ to vary from $V_{ref}$.

An exemplary predetermined or threshold value for the vapor pressure comparison is 0.05 kPa. It can be appreciated, however, that the threshold value may vary based on vehicle type, vehicle configuration, and fuel system characteristics. To determine the threshold value for a vehicle, a series of tests are performed that include variable rates of fuel filling, door slamming, rocking of the vehicle, and other actions that result in vapor pressure signal spikes. The empirical data representative of non-fuel filling events (e.g., door slam, vehicle rocking) are ignored and the threshold value is interpolated from the remaining data (e.g., data representing a fuel filling event).

In step 112, control compares the difference between $FL_{pres}$ and $FL_{ref}$ to a predetermined threshold. If the difference is greater than the threshold, a fuel filling event is detected and control continues with step 124. Otherwise, control continues with step 114. An exemplary threshold is 10% of fuel tank volume. It can be appreciated, however, that the threshold may vary based on vehicle type, vehicle configuration, and fuel system characteristics. In step 114, control determines whether the EONV test is complete. If complete, control ends. Otherwise, control loops back to step 110 to compare the updated $V_{ref}$ to $V_{pres}$.

In step 124, control terminates the EONV test and the vent valve 50 is opened. Control confirms the fuel filling event to justify termination of the EONV test. In step 126, control continues to monitor $FL_{pres}$ for a predetermined period. In step 128, control determines whether $FL_{pres}$ confirms the fuel filling event by sensing a fuel level change that persists for a period of time. If so, then control confirms the termination in step 130. If not, control reports a termination fault in step 132.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A leak detection system for a vehicle, comprising:

a fuel system; and a controller that communicates with said fuel system, that detects a fuel filling event, that initiates a vapor leak test of said fuel system, and that terminates said vapor leak test if a fuel filling event is detected.

2. The leak detection system of claim 1 further comprising a vent valve that seals said fuel system, wherein said controller closes said vent valve after initiating said vapor leak test.

3. The leak detection system of claim 1 wherein said controller monitors vapor pressure within said fuel system to detect said fuel filling event.

4. The leak detection system of claim 1 wherein said controller monitors a fuel level in a fuel tank of said fuel system to detect said fuel filling event.

5. The leak detection system of claim 1 wherein said controller monitors a fuel level within a fuel tank of said fuel system after terminating said vapor leak test to confirm that said fuel filling event occurred.

6. A method of testing vacuum of a fuel system, comprising:

initiating a vapor leak test;

generating a vapor pressure signal for said fuel system; and terminating said vapor leak test if a difference between said vapor pressure signal and a reference vapor pressure signal is greater than a threshold value.

7. The method of claim 6 further comprising sealing said fuel system.

8. The method of claim 7 further comprising unsealing said fuel system if said vapor leak test is terminated.

9. The method of claim 6 further comprising updating said reference vapor pressure signal.

10. The method of claim 9 wherein said step of updating includes setting said reference vapor pressure signal equal to a previous vapor pressure signal.

11. The method of claim 6 further comprising filtering said vapor pressure signal.

12. The method of claim 6 further comprising ending said vacuum test after a predetermined time period.

13. The method of claim 6 further comprising:

monitoring a fuel level within a fuel tank of said fuel system; and terminating said vapor leak test if said fuel level increases a predetermined level.

14. The method of claim 13 wherein said monitoring said fuel level includes:

setting an initial fuel level equal to a reference fuel level upon initiating said vapor leak test; and indicating a fuel level increase if a difference between a present fuel level and said reference fuel level is greater than said predetermined level.

15. The method of claim 6 further comprising:

monitoring a fuel level within said fuel system if said vapor leak test is terminated; and confirming said termination if said fuel level increases.

16. A method of testing vacuum of a fuel system, comprising:

detecting a key-off event;

initiating a vapor leak test if a pre-condition is present;

generating a current vapor pressure signal for said fuel system;

monitoring a fuel level of a fuel tank of said fuel system; and terminating said vapor leak test if at least one of said present vapor pressure signal and said fuel level indicates a fuel filling event.

17. The method of claim 16 further comprising sealing said fuel system.

18. The method of claim 17 further comprising unsealing said fuel system if said vapor leak test is terminated.

19. The method of claim 16 wherein said vapor leak test is terminated if a difference between said current vapor pressure signal and a reference vapor pressure signal is greater than a threshold value.

20. The method of claim 19 further comprising updating said reference vapor pressure signal.

21. The method of claim 20 wherein said updating comprises setting said reference vapor pressure signal equal to a previous vapor pressure signal.

22. The method of claim 19 further comprising filtering said current vapor pressure signal.

23. The method of claim 16 further comprising ending said vapor leak test after a predetermined time period.

24. The method of claim 16 wherein said monitoring a fuel level comprises:

setting an initial fuel level equal to a reference fuel level upon initiating said vapor leak test; and indicating a fuel level increase if a difference between a present fuel level and said reference fuel level is greater than said predetermined amount.

25. The method of claim 16 further comprising:

monitoring said fuel level within said fuel system if said vapor leak test is terminated; and confirming said termination if said fuel level increases.

26. A method of detecting a fuel filling event of a fuel system, comprising:

generating a vapor pressure signal for said fuel system;

monitoring a fuel level of a fuel tank of said fuel system; and signaling said fuel filling event if at least one of said vapor pressure signal and said fuel level indicates a fuel filling event.

27. The method of claim 26, further comprising:

setting an initial fuel level equal to a reference fuel level; and indicating a fuel level increase if a difference between said fuel level and said reference fuel level is greater than a predetermined amount.

28. The method of claim 26, further comprising:

updating a reference vapor pressure signal; and indicating a fuel level increase if a difference between said vapor pressure signal and said reference vapor pressure signal is greater than a predetermined amount.

29. The method of claim 26, further comprising:

monitoring said fuel level within said fuel system if said fuel filling event is detected; and confirming an occurrence of said fuel filling event if said fuel level increases.

* * * * *